Aug. 5, 1930.  F. E. PAYNE  1,772,263
GASKET
Filed Nov. 6, 1928
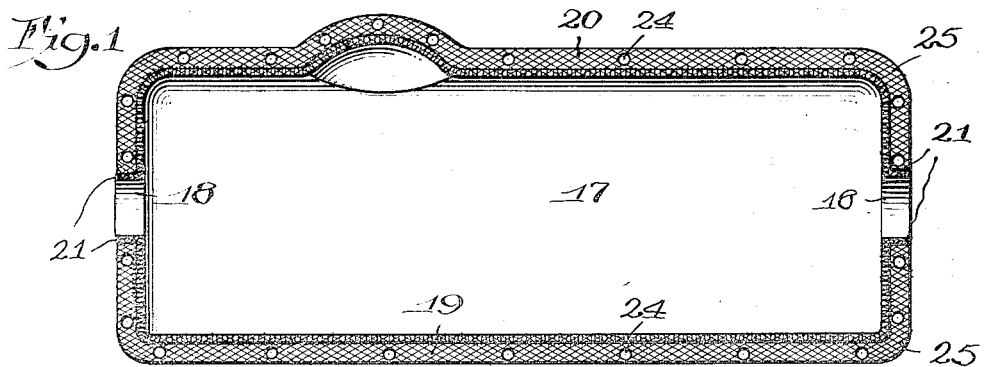
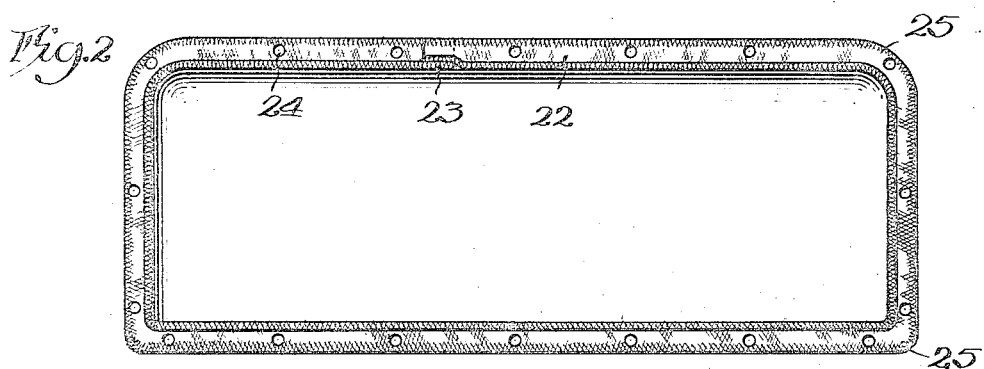
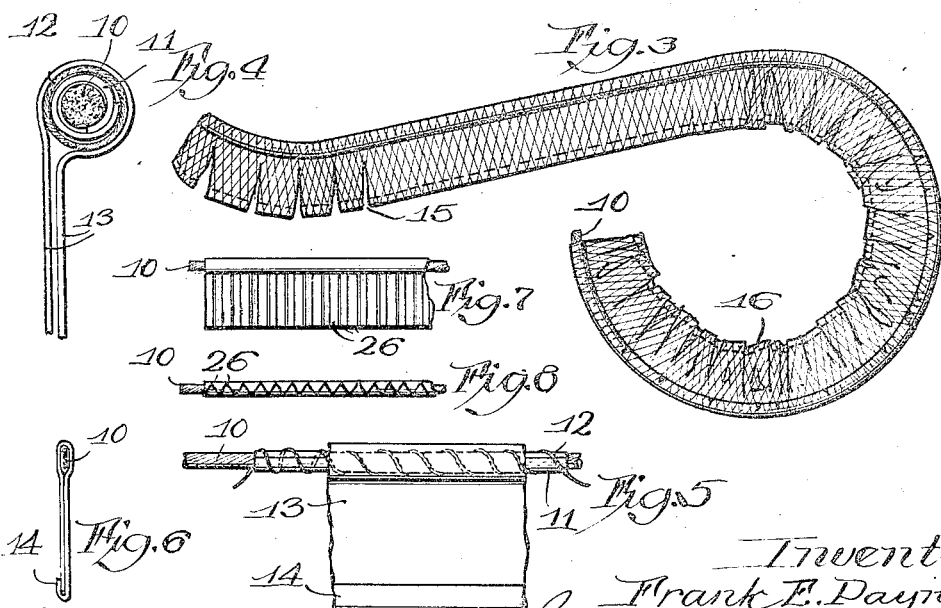
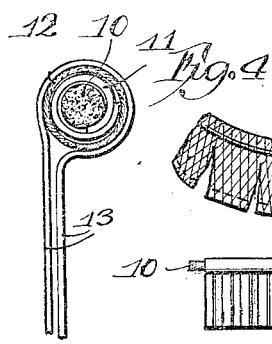
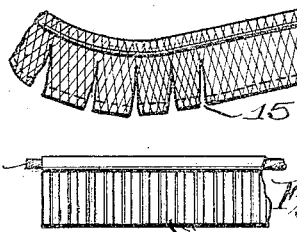
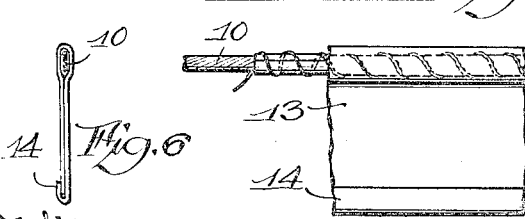
Inventor,
Frank E. Payne, Patented Aug. 5, 1930

1,772,263

UNITED STATES PATENT OFFICE

FRANK E. PAYNE, OF CHICAGO, ILLINOIS

GASKET

Application filed November 6, 1928. Serial No. 317,536.

This invention relates to improvements in gaskets, particularly adapted for use as replacement gaskets, in connection with repair work on automobiles, trucks, tractors, airplanes and the like, although adapted also for installation initially when the engines which are used in the vehicles, are first assembled, as well as for general power uses.

The objects of the invention are to provide an improved gasket which fulfills the foregoing requirements; which may be kept in stock on a roll and cut off as required; which may be readily bent to shape, and in the use of which there is practically no waste.

In the accompanying drawings,

Fig. 1 shows one form of gasket as applied to the oil pan of an automobile engine.

Fig. 2 shows another form of gasket for a different type of oil pan.

Fig. 3 is a top plan view of a length of finished gasket on a somewhat larger scale.

Fig. 4 is an enlarged section of a modified form, with the parts separated to show the arrangement more clearly.

Fig. 5 is an enlarged elevation of the gasket with certain parts removed.

Fig. 6 is an end elevation thereof.

Fig. 7 is a plan view of a similar gasket with a fluted margin, and

Fig. 8 is an elevation thereof.

In carrying out my invention I may employ a cotton or hemp cord 10 or other resilient longitudinal member more or less circular in cross section and preferably made of fibrous material, asbestos being suitable where high temperatures are to be encountered. For certain purposes, this core may be reenforced by being enclosed or wrapped in thin sheet metal, such as Babbitt foil for example, or thin copper or aluminum. In fact the core itself may be of soft compressible metal if desired. Where the reenforcing jacket is desired, a long narrow strip 11 of thin flexible metal is used. It is rolled spirally to enclose the core, as illustrated in Fig. 4, the parts being shown with a clearance instead of being tightly rolled, to render the illustration clearer. In the drawing, the reenforcing strip of metal is wide enough so that its edges overlap each other only slightly although it may be wide enough to make several complete turns or folds about the core, thus forming a spiral wrapping or folded envelope. This wrapping may be held snugly in place by any suitable tension member such as a thread or string 12, wrapped helically around the metal covering as shown in Fig. 5, for example, or this metal armor may be cemented or securely fastened to the core in other ways. The armored core may be used where conditions are bad as where acid is present. However, for general purposes a simple braided cotton core without any armor is preferable.

The next step is to enclose the core, whether of cotton of other fibrous material alone, or fibrous material suitably reenforced, in a strip of metal 13 which is folded around the same as shown in Fig. 4 with the core near the middle of said strip, the two margins being pressed together and extending to one side of the bead thus formed, providing a web or apron. One of the two margins is preferably wider than the other, the wider one being folded over or under the narrower one as shown at 14 in Fig. 5, to reenforce the edges and lock them together thus preventing them from separating or showing a crack when the packing is bent. The complete packing thus formed is substantially flat with a compressible bead at one edge and a reenforced or slightly thickened closure at the other edge. The bead or sealing edge is readily compressible and forms the sealing member of the gasket, the web or apron having holes punched therein as hereinafter described to permit the gasket to be held in place until it is compressed between the two parts which require to be sealed against leakage.

In passing the metal foil through rollers to bend it, prior to the insertion of the core therein, it is desirable to roll a groove in the metal to receive said core, after which the margins are brought together and one edge folded over the other by passing the product through a suitable series of rollers and dies.

The completed packing is preferably passed between knurling rollers, which knurl or score the metal as shown in Figs. 1, 2, and 3, for example, whereby it may be readily bent as in rolling on a reel as it comes from the machine which forms it. Where the core is made of cotton, it is preferably in braided form, and of fairly large diameter. The knurling operation causes a certain flattening of the bead, thus insuring uniform thickness thereof. However, the gasket strip is thicker on one edge than on the other, and in winding it for delivery, two superimposed strips are wound on a single reel, one strip having the bead at one side, and the other at the other side, so that the spirally wound product winds smoothly and without a greater diameter at one side than at the other. After shipment, when it is being drawn from the reel and cut off into suitable lengths for use, it is readily flattened out without decided creases or bends therein, because of the knurling.

As illustrated in Fig. 3 the gasket may be readily bent in either direction in the plane of the web. In bending it so that the bead forms the inside or smaller circle, the web may be readily torn where the metal is very soft, as in the case of babbitt for example, or said metal may be cut with shears or knife to form a series of slits at right angles to the bead as shown at 15. Where the bend is to be made in the opposite direction, i. e., with the bead forming the curve of greater diameter than the folded over margin, the web may simply be folded over itself as shown at 16, or lapped when cut with shears.

The oil pan cover 17 in Fig. 1 represents a type in which there is a semi-circular recess 18 at each end in which case the gasket is interrupted, i. e., two lengths are required 19 and 20, each of which terminates at said recesses. The gaskets ordinarily used when the automobiles are assembled, are made of some cork or paper composition, formed to fit the particular oil pan. In removing the oil pan these gaskets are usually damaged or destroyed, or they may be partially disintegrated so that when the oil pan is again bolted in place a substitute gasket or new gasket has to be used. The oil pans used on the different makes of automobiles are of various sizes and shapes making it necessary for the garage owner or repair man to keep in stock a great variety of gaskets of the standard type for replacement work. One important advantage of the improved gasket described herein is that it may be kept in stock in long lengths rolled on the reel and by merely cutting off the proper length and bending it, a gasket may be readily adapted by hand to fit any oil pan.

As shown in Fig. 1 the gasket strip is laid on the upper surface of the oil pan with the bead preferably on the inside of its bolt holes and the web placed over the holes. The holes for the bolts are readily marked by pressing the metal of the web into the oil pan bolt holes with one finger after which the holes are punched through the web with any suitable instrument either made of metal or wood, as the thin metal is readily punctured when made of foil such as babbitt, or other soft metal. Punching the holes in this manner causes the metal at the periphery of each hole to be bent down into the hole thus holding the gasket in place until the bolts can be inserted when the pan is lifted upwardly against the housing of which it is to form a part. When the nuts are tightened on the bolts the bead is compressed to whatever extent is necessary to make a tight joint throughout its entire length. Any slight variation in the space between the two parallel surfaces between which the bead is clamped is readily compensated for by the bead, which compresses more or less in accordance with the necessities of the case and provides a tight joint.

At the ends, where the semi-circular recesses 18 are located, it may be desirable to turn the bead outwardly as shown at 21 to insure a snug fit against the shaft or other member which is to be received within said semi-circular opening. A tight joint may be maintained, however, by cutting off the packing exactly the right length.

Although the thin sheet metal jacket 11 is desirable, it is not essential in most cases, and the packing may be made up by simply surrounding the core of fibrous or other compressible material with the soft sheet metal which is bent or folded around it to provide the web, the helical or folded string wrapping being omitted also in this case as previously explained.

Where the gasket is used as standard equipment as in initially assembling a car, it is desirable to have it preformed to fit the pan exactly and in such case it would be delivered in the form shown in Fig. 1. Another preformed gasket is shown in Fig. 2, in which a long length of gasket is bent around to a rectangular form 22, with one end 23 overlapping or enclosing the other slightly, although this would involve more labor than the two-part gasket described.

The holes 24 in both cases are punched in advance, at predetermined locations and the four corners 25 are bent in such a way as to stretch the metal and maintain the web in a horizontal plane, or the metal at the corners may be cut, as previously explained. The stretching may be done in various ways. For example, where Babbitt foil is used, a certain length of the web may be pressed in a die to flute the outer edge as at 26, that is, to give it a wavy or accordion-plaited form, by stretching the metal without tearing it, whereby when the gasket is bent, the wavy portions are drawn out smoothly as shown in Fig. 2. Fig. 7 shows a plan view and Fig. 8 an elevation of an edge thus elongated before the packing is bent.

Although the gasket is described herein more particularly with reference to automobile oil pan uses, it is adapted of course for general power plant and other uses, such, for example, as a pipe flange gasket. Where high temperatures are to be encountered the core may be made of asbestos and the packing as a whole simply bent to circular form with the bead preferably located on the inner edge of the flat ring thus formed, and the interlocked margins constituting the outer edge of said flat ring. The ends are overlapped slightly the same as in Fig. 2 and bolt holes readily punched by hand. Gaskets may thus be made to fit practically any size or shape of opening. The metal in most cases is so soft that it may be pressed down into the bolt holes by the finger to aid in marking the location of said holes prior to using the punch.

Among other advantages, a gasket formed in accordance with the disclosure herein, has long life, as oil cannot decompose or disintegrate the resilient sealing member as it does unprotected cork, paper, or other gasket material. The sealing edge is compressible and conforms to every irregularity of the joint. It may be readily applied and there is no waste, as no more of the material is used than is necessary.

Although the web or positioning flange is preferably made of thin sheet metal for many gasket purposes, it is evident that other thin flexible material may be used in certain cases for positioning the gasket.

I claim:

1. A gasket comprising a longitudinal, compressible member and a metal foil envelope surrounding the same and extending laterally to form a positioning web, said positioning web having holes therein.

2. A gasket comprising a cylindrical fibrous member, a soft sheet metal wrapping for the same, a strip of soft sheet metal doubled over on itself with one margin wider than the other with said wrapped member enclosed in the bend, the edge of said wider margin being folded over the narrower margin, forming a compressible bead at one end of the finished gasket, and a closure at the other edge.

3. A gasket comprising a fibrous cord having a long narrow strip of soft pliable sheet metal rolled spirally about the same, a helical tension member surrounding said sheet metal to hold it in place, and a wider strip of soft pliable metal folded about the reenforced cord with its margins pressed together leaving a ridge at one side of the finished gasket, said margins having registering openings therein to position said gasket.

4. A gasket comprising a cylindrical fibrous member, a strip of soft sheet metal having a longitudinal groove pressed therein near the middle thereof and doubled over on itself, with one margin wider than the other, with said member enclosed in said groove, the edge of said wider margin being folded over the narrower margin forming a closure at said edge, the other side of said gasket having the form of a compressible bead, the entire gasket being scored transversely to increase the flexibility thereof and to flatten said bead to a uniform thickness.

5. An automobile oil pan gasket strip comprising a longitudinal member, a thin strip of flexible material resistant to disintegration by oil, doubled over on itself and enclosing said longitudinal member, one margin of said doubled over strip being wider than the other and being folded over the narrower margin, thereby forming a compressible bead at one side of the finished gasket and a closure at the other side thereof.

In testimony whereof, I have subscribed my name.

FRANK E. PAYNE.